US011885173B2

(12) United States Patent
Kendall et al.

(10) Patent No.: US 11,885,173 B2
(45) **Date of Patent: *Jan. 30, 2024**

(54) PASSIVE DOOR BOLT ASSEMBLY

(71) Applicant: Endura Products, LLC, Colfax, NC (US)

(72) Inventors: Adam Kendall, Burlington, NC (US); Tomasz Jaskiewicz, Oak Ridge, NC (US)

(73) Assignee: Endura Products, LLC, Colfax, NC (US)

( * ) Notice: Subject to any disclaimer, the term of this patent is extended or adjusted under 35 U.S.C. 154(b) by 541 days.

This patent is subject to a terminal disclaimer.

(21) Appl. No.: 17/086,563

(22) Filed: Nov. 2, 2020

(65) Prior Publication Data

US 2021/0047877 A1 Feb. 18, 2021

Related U.S. Application Data

(63) Continuation of application No. 15/274,061, filed on Sep. 23, 2016, now Pat. No. 10,829,981.

(51) Int. Cl.
*E06B 3/36* (2006.01)
*E05B 63/18* (2006.01)
(Continued)

(52) U.S. Cl.
CPC .............. *E06B 3/365* (2013.01); *E05B 63/18* (2013.01); *E05C 7/045* (2013.01); *E05C 19/001* (2013.01); *E06B 7/18* (2013.01)

(58) Field of Classification Search
CPC . E06B 3/365; E06B 7/18; E05B 63/18; E05B 7/18; E05C 7/045; E05C 19/001;
(Continued)

(56) References Cited

U.S. PATENT DOCUMENTS 137,211 A 3/1873 Jones
618,305 A 1/1899 Weaver
(Continued)

FOREIGN PATENT DOCUMENTS

CA 1059552 A 7/1979
CA 2342941 A1 1/2001
(Continued)

OTHER PUBLICATIONS

Official Action of Canadian App. No. 2976558, dated May 8, 2019, 7 pgs.

(Continued)

*Primary Examiner* — Christine M Mills
*Assistant Examiner* — Faria F Ahmad
(74) *Attorney, Agent, or Firm* — Womble Bond Dickinson (US) LLP

(57) ABSTRACT

A bolt assembly for securing a passive door panel relative to an entryway frame. The bolt assembly has a base to be fixedly mounted relative to the passive door panel, a catch attached to the base with a leaf spring to deflect relative to the base, and a bolt which is able to translate relative to the base between a retracted position and an extended position for securing the passive door panel. The bolt is biased toward the extended position and selectively maintained in the retracted position by the catch.

20 Claims, 11 Drawing Sheets

(51) Int. Cl.
*E05C 7/04* (2006.01)
*E05C 19/00* (2006.01)
*E06B 7/18* (2006.01)

(58) Field of Classification Search
CPC ... E05C 1/006; E05C 1/04; E05C 7/04; Y10S 292/21; Y10S 292/37; Y10S 292/44; Y10S 292/63; Y10T 292/0834; Y10T 292/0836; Y10T 292/0845; Y10T 292/0961; Y10T 292/0962; Y10T 292/0969; Y10T 292/097; Y10T 292/0995; Y10T 292/103
See application file for complete search history.

(56) References Cited

U.S. PATENT DOCUMENTS

| | | | | |
|---|---|---|---|---|
| 826,943 | A | 7/1906 | Kieffer et al. | |
| 1,077,433 | A | 11/1913 | Schlis | |
| 2,586,900 | A | 2/1952 | Alderman | |
| 2,610,368 | A | 9/1952 | Tschaepe | |
| 3,211,850 | A | 10/1965 | Toepfer | |
| 3,378,290 | A * | 4/1968 | Sekulich | E05C 9/04 292/40 |
| 3,432,966 | A | 3/1969 | Bordner | |
| 3,455,591 | A * | 7/1969 | Powers | E05B 65/1046 292/335 |
| 3,487,581 | A * | 1/1970 | Ellingson, Jr. | E06B 7/231 49/478.1 |
| 3,578,369 | A | 5/1971 | Coopersmith | |
| 3,617,080 | A | 11/1971 | Miller | |
| 3,638,984 | A | 2/1972 | Davidson | |
| 3,649,060 | A | 3/1972 | Ruff | |
| 3,656,788 | A | 4/1972 | Emery | |
| 3,788,679 | A | 1/1974 | Banham | |
| 3,788,687 | A | 1/1974 | Zawadzki | |
| 3,888,046 | A | 6/1975 | Meisterheim | |
| 3,999,110 | A | 12/1976 | Ramstrom | |
| 4,005,886 | A | 2/1977 | Lirette | |
| 4,049,304 | A | 9/1977 | Imhoff | |
| 4,052,819 | A | 10/1977 | Beischel et al. | |
| 4,283,882 | A | 8/1981 | Hubbard et al. | |
| 4,428,153 | A | 1/1984 | Klinger et al. | |
| 4,429,493 | A | 2/1984 | St. Aubin | |
| 4,445,717 | A | 5/1984 | Imhoff | |
| 4,489,968 | A | 12/1984 | Easley | |
| 4,625,457 | A | 12/1986 | Avery | |
| 4,644,696 | A | 2/1987 | Bursk | |
| 4,999,950 | A | 3/1991 | Beske | |
| 5,165,740 | A | 11/1992 | Curnes et al. | |
| 5,197,771 | A | 3/1993 | Kaup | |
| 5,290,077 | A | 3/1994 | Fleming | |
| 5,328,217 | A | 7/1994 | Sanders | |
| 5,335,450 | A | 8/1994 | Procton | |
| 5,350,207 | A | 9/1994 | Sanders | |
| 5,524,942 | A | 6/1996 | Fleming | |
| 5,590,919 | A | 1/1997 | Germano | |
| 5,603,534 | A | 2/1997 | Fuller | |
| 5,782,114 | A | 7/1998 | Zeus | |
| 5,791,700 | A | 8/1998 | Biro | |
| 5,857,291 | A | 1/1999 | Headrick | |
| 5,906,403 | A | 5/1999 | Bestler | |
| 6,009,732 | A | 1/2000 | Haeck et al. | |
| 6,131,966 | A | 10/2000 | Hensley et al. | |
| 6,282,929 | B1 | 9/2001 | Eller et al. | |
| 6,409,231 | B1 | 6/2002 | Rusiana | |
| 6,457,751 | B1 | 10/2002 | Hartman | |
| 6,491,326 | B1 | 12/2002 | Massey et al. | |
| 6,594,861 | B2 | 7/2003 | Dimig | |
| 6,874,830 | B2 | 4/2005 | Bashford | |
| 6,883,837 | B1 | 4/2005 | Lin | |
| 6,966,585 | B2 | 11/2005 | Egi et al. | |
| 6,971,686 | B2 | 12/2005 | Becken | |
| 7,036,854 | B1 | 5/2006 | Lai | |
| 7,144,053 | B2 | 12/2006 | Bashford | |
| 7,267,379 | B2 | 9/2007 | Rusiana | |
| 7,543,860 | B2 | 6/2009 | Meeks | |
| 7,641,244 | B2 | 1/2010 | Lin | |
| 7,669,902 | B2 | 3/2010 | Orbeta | |
| 7,722,097 | B2 | 5/2010 | Schnarr et al. | |
| 7,735,882 | B2 | 6/2010 | Abdollahzadeh et al. | |
| 7,752,875 | B2 | 7/2010 | Constantinou et al. | |
| 7,900,981 | B2 | 3/2011 | Hirschoff | |
| 7,942,458 | B2 | 5/2011 | Patterson | |
| 8,157,298 | B2 | 4/2012 | Mitchell et al. | |
| 8,157,299 | B2 | 4/2012 | Mitchell et al. | |
| 9,097,043 | B2 | 8/2015 | Mitchell et al. | |
| 10,604,990 | B2 * | 3/2020 | Kendall | E06B 7/18 |
| 10,829,981 | B2 | 11/2020 | Kendall et al. | |
| 10,975,611 | B2 * | 4/2021 | Kendall | E05C 7/045 |
| 2005/0116424 | A1 | 6/2005 | Sanders | |
| 2005/0120631 | A1 | 6/2005 | Sanders | |
| 2005/0193784 | A1 | 9/2005 | Sanders | |
| 2006/0145488 | A1 | 7/2006 | Wittke et al. | |
| 2007/0001469 | A1 | 1/2007 | Balbo Di Vinadio | |
| 2007/0029812 | A1 | 2/2007 | Monts de Oca | |
| 2007/0283629 | A1 | 12/2007 | Phipps | |
| 2008/0087052 | A1 | 4/2008 | Abdollahzadeh et al. | |
| 2009/0019779 | A1 * | 1/2009 | Nakanishi | E05B 63/185 49/449 |
| 2009/0033107 | A1 | 2/2009 | Zimmer | |
| 2011/0018285 | A1 * | 1/2011 | Mitchell | E05C 9/1891 292/161 |
| 2011/0309641 | A1 | 12/2011 | Raatikainen | |
| 2012/0001443 | A1 | 1/2012 | Mitchell | |
| 2016/0053527 | A1 * | 2/2016 | Olson | E06B 1/70 49/471 |
| 2018/0087311 | A1 | 3/2018 | Kendall | |
| 2018/0100346 | A1 | 4/2018 | Kendall | |
| 2019/0119952 | A1 * | 4/2019 | Jaskiewicz | E05C 9/085 |

FOREIGN PATENT DOCUMENTS

| | | | |
|---|---|---|---|
| CA | 2455696 | A1 | 7/2004 |
| FR | 338994 | A | 10/1904 |
| FR | 2467277 | A1 | 4/1981 |
| GB | 967947 | A | 8/1964 |
| KR | 20180055506 | A | 5/2018 |
| WO | 0165039 | A1 | 9/2001 |

OTHER PUBLICATIONS

Official Action of Canadian App. No. 2,693,833, dated Oct. 28, 2011, 3 pgs.
Official Action of U.S. Appl. No. 12/895,429, dated Oct. 17, 2011, 7 pgs.
Official Action of U.S. Appl. No. 12/895,432, dated Oct. 17, 2011, 8 pgs.

* cited by examiner

PASSIVE DOOR BOLT ASSEMBLY

CROSS REFERENCE TO RELATED APPLICATION

This application is a continuation application of U.S. patent application Ser. No. 15/274,061 filed on Sep. 23, 2016, the entire contents of which are hereby incorporated by reference.

FIELD OF THE PRESENT DISCLOSURE

The present disclosure relates to bolts, particularly slide bolts, used to secure a passive door of a double door entryway.

BACKGROUND

French door, or double door, entryway units are popular in commercial and residential settings for their pleasing aesthetics and functional practicality. The optional ability to open a secondary (i.e. passive) door panel greatly increases the ability for ingress and egress of persons and household items.

As seen in FIG. 1, a French door entryway 10 traditionally includes a passive door panel 12, and an adjacent active door panel 14. The sets of door panels may swing inwardly (as shown in FIG. 1) into the structure (so-called "inswing" doors), or may swing outwardly from the structure (so-called "outswing" doors). The passive door panel 12 typically includes an astragal 16 mounted along the entire extent of a non-hinged vertical edge (stile) of the passive door panel. In its most simple form, the astragal 16 may be little more than molding attached to the passive door panel 12 to act as a stop for the active door panel 14. More recently, astragals 16 have taken the form of assemblies mounted to the stile of the passive door panel 12, which have a significant role in the structural and environmental resistance performance of the entryway 10. The astragal 16 has a role in securing the passive door panel 12 in place, and often includes seals to prevent the infiltration of moisture into the building.

To secure the passive door panel 12 in a closed position, the astragal 16 may be provided with hardware 18, such as sliding bolts, adjacent to a top and bottom of the passive door panel. The hardware 18 typically engages a frame 19 of the entryway. The frame may have a header 20 spanning the top of the entryway 10 and a threshold 22 (also referred to as a door sill) spanning the bottom of the entryway. Hardware 18 mounted near the top of the passive door panel would extend upward to engage the header 20, and hardware mounted near the bottom of the passive door panel would extend downward to engage the threshold 22.

Improper assembly or installation of an entryway 10 can create conditions where the hardware 18 is prevented from moving into its fully engaged position. This can lead to reduced strength under wind loads and to sub-optimal compression of sealing components. Therefore, designers continue to make improvements to the hardware 18 to provide a more secure, robust and consistent device for maintaining the passive door panel 12 in a closed position.

SUMMARY

Some embodiments of the present disclosure describe a bolt assembly configured to secure a passive door panel relative to an entryway frame. The bolt assembly comprises a base configured to be mounted to the passive door panel or an astragal on the passive door panel. The base is configured to be fixed relative to the passive door panel. A catch is attached to the base with a leaf spring so that the catch can deflect relative to the base between an engagement position and a release position. The catch is biased toward the engagement position. The catch comprises an actuation button and a keeper. A bolt is configured to translate relative to the base between a retracted position and an extended position. The bolt comprises a slide having a pocket. The keeper is configured to engage the pocket to retain the bolt in the retracted position. A pin is attached to the slide for movement therewith. The pin is configured to engage the entryway frame when the bolt is in the extended position. A spring is configured to bias the bolt to the extended position. If the bolt is in the retracted position, pressing upon the actuation button would deflect the catch to the release position, the catch would disengage from the pocket, and the spring would push the bolt to the extended position.

Other embodiments of the present disclosure describe astragals configured to secure a passive door panel relative to an entryway frame. An exemplary astragal comprises an astragal body having a channel running along a length of the astragal body, and a bolt assembly. The bolt assembly includes a base fixed relative to the astragal body and a bolt configured to slide relative to the base between a retracted position and an extended position. A spring is located between the base and the bolt. The spring is configured to bias the bolt to the extended position. A catch is attached to the base with a leaf spring for retaining the bolt in the retracted position. If the bolt is in the retracted position, deflecting the catch releases the bolt to slide to the extended position.

Yet another embodiment of the present disclosure describes an astragal configured to be mounted to a passive door panel. The astragal comprises an astragal body having a channel running along a length of the astragal body, a trim cover mounted to the astragal body to at least partially enclose the channel, a first bolt assembly arranged adjacent to a bottom end of the astragal body, and a second bolt assembly arranged adjacent to a top end of the astragal body. The first bolt assembly comprises a base fixedly mounted within the channel, a catch attached to the base with a leaf spring to deflect relative to the base between an engagement position and a release position, the catch biased toward the engagement position. The catch comprises an actuation button and a keeper. The first bolt assembly also comprises a bolt configured to translate relative to the astragal body between a retracted position and an extended position relative to the astragal body. The bolt comprises a slide having a pocket, the keeper configured to engage the pocket to retain the bolt in the retracted position. A pin is attached to the slide for movement therewith, the pin configured to engage an entryway frame when the bolt is in the extended position. A spring is configured to bias the bolt to the extended position. A pull is pivotably mounted to the slide for use when returning the bolt to the retracted position. A lock block configured to translate relative to the base and the bolt, and having one or more sealing pads fixed to the lock block, is provided as part of the first bolt assembly. A compression spring is operable between the bolt and the lock block of the first bolt assembly. The second bolt assembly does not include a lock block, but instead includes a guide block fixedly mounted adjacent to the top end of the astragal body, the guide block having a passage through which the pin is configured to slidably extend.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 2:
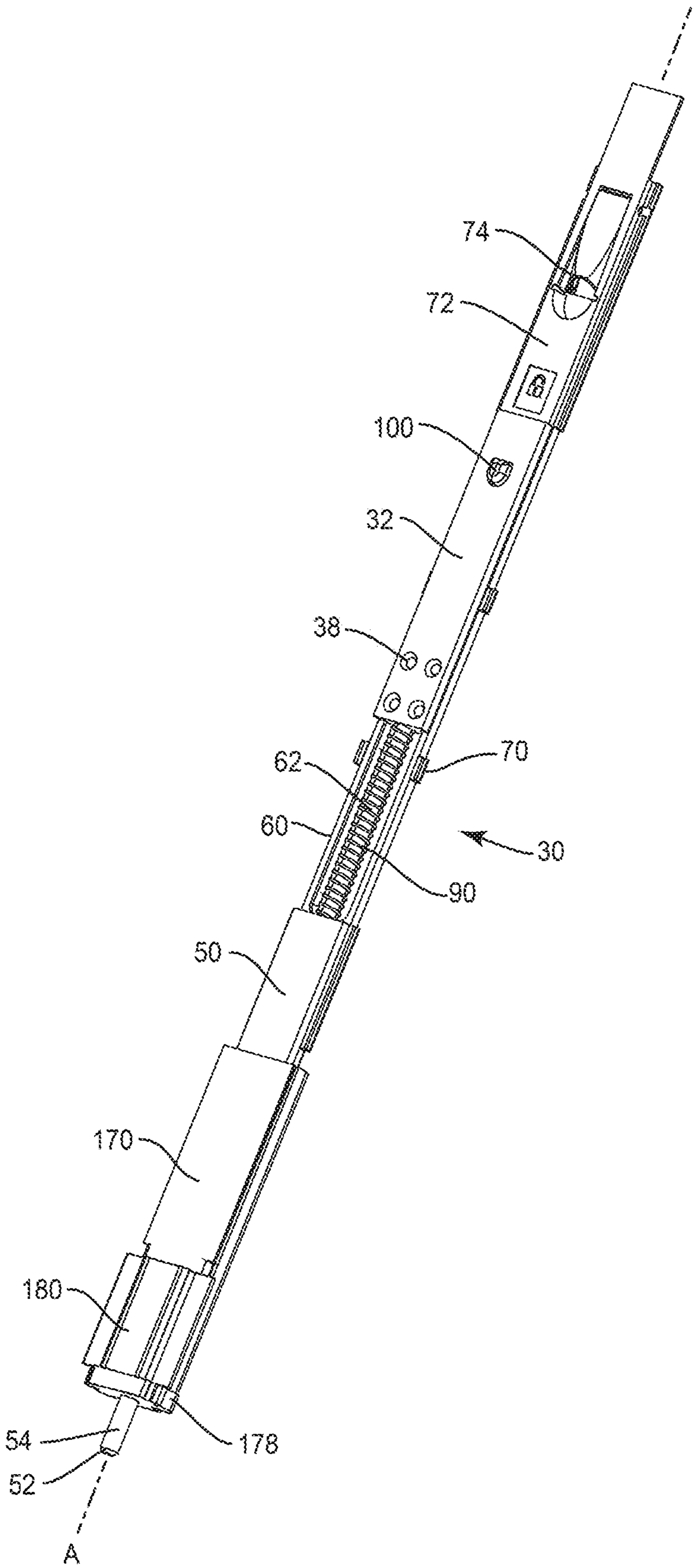
FIG. 2 is a front perspective of a bolt assembly according to embodiments of the present disclosure.
Figure 3:
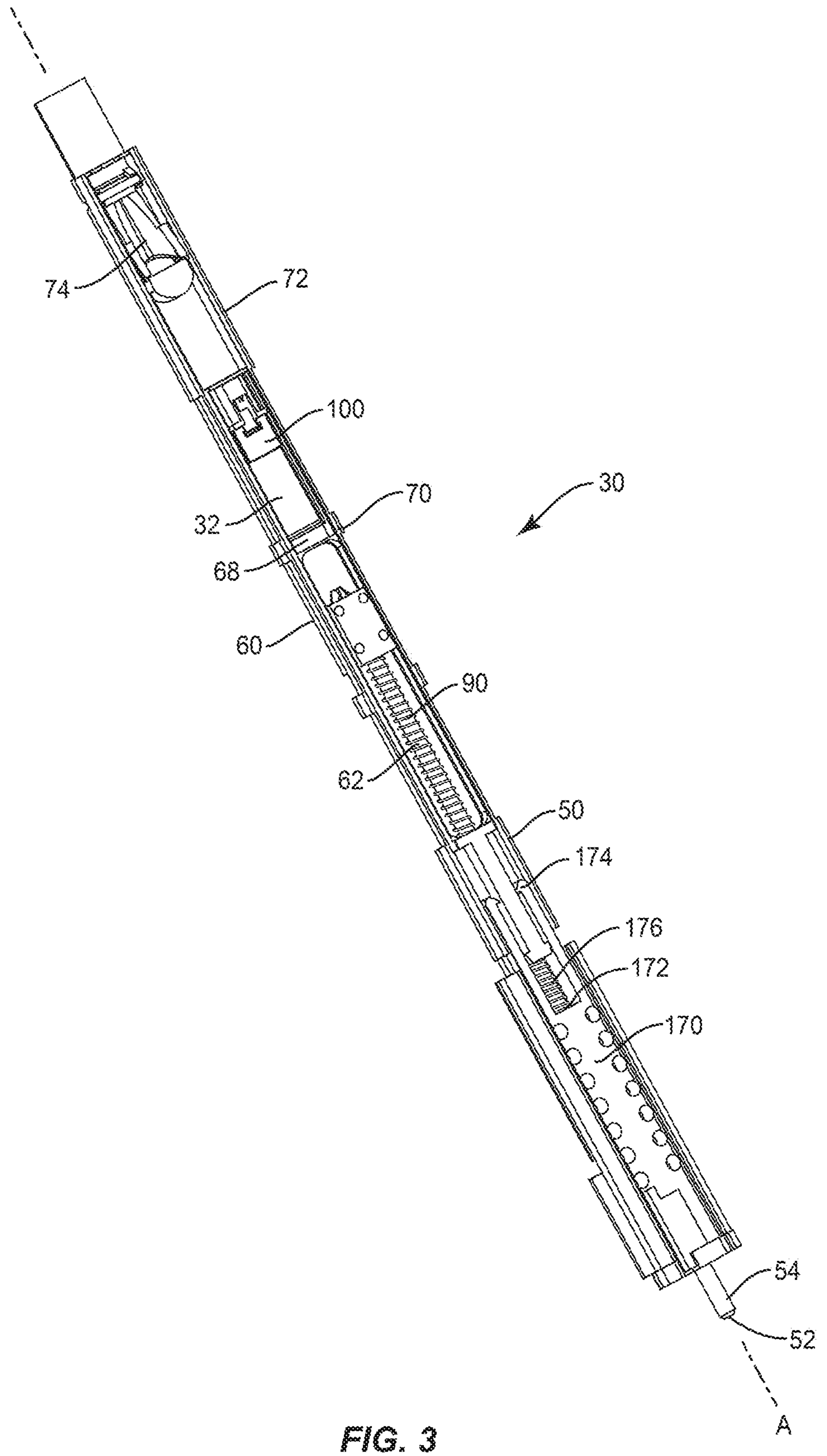
FIG. 3 is a rear perspective of the bolt assembly of FIG. 2.

Turning to FIGS. 2 and 3, front and rear perspective views of a bolt assembly 30 are provided. The bolt assembly 30 includes an anchoring base 32, hereafter base 32. In one embodiment, the base 32 is used to mount the bolt assembly 30 to a passive door panel 12. For example, a mortise may be provided on the non-hinged stile of the passive door panel 12 to receive the bolt assembly 30. In a preferred embodiment, the bolt assembly 30 is combined into an astragal as discussed below and shown in FIG. 9. In this embodiment, the base 32 may be used to securely position the bolt assembly 30 as part of the astragal. The base 32 would be fixedly mounted relative to the passive door panel 12 to swing with the door panel and avoid relative movement between the passive door panel 12 and the base.

Figure 1:
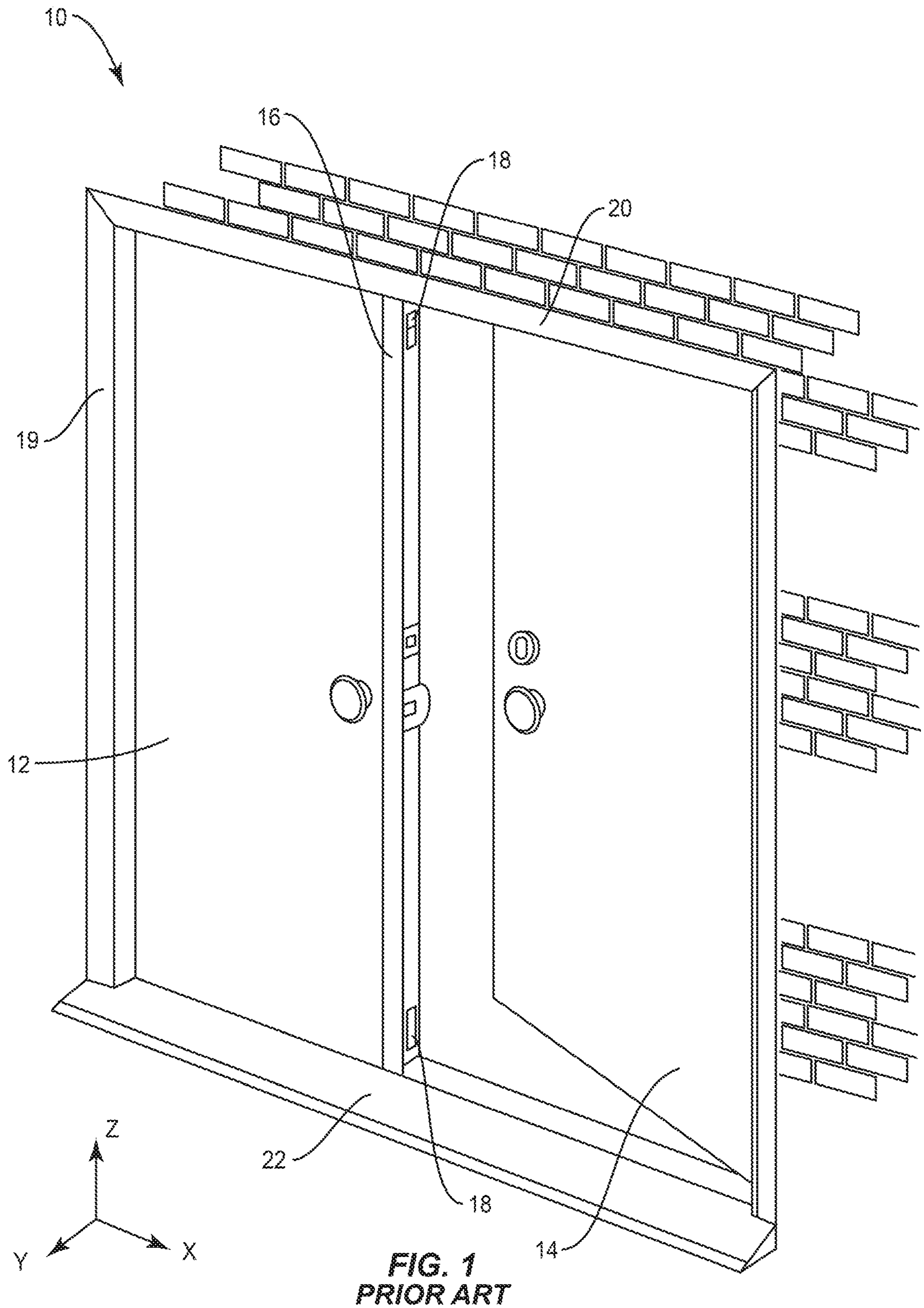
FIG. 1 PRIOR ART
FIG. 1 is an elevation view of a typical French door entryway.
Figure 4:
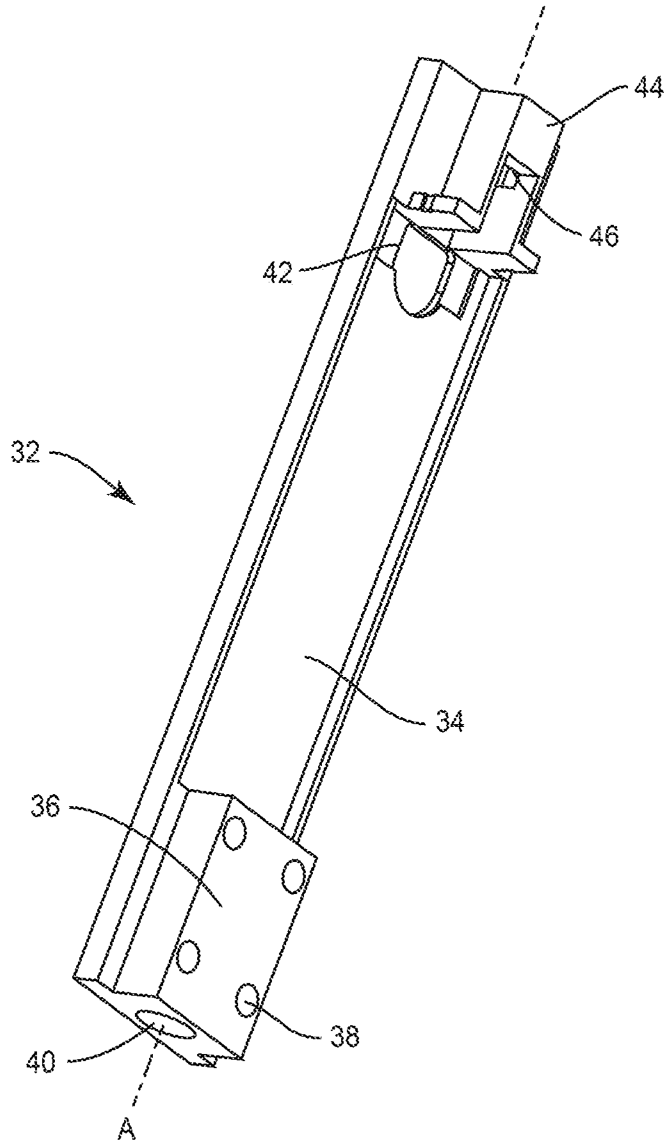
FIG. 4 is a rear perspective view of an anchoring base of the bolt assembly of FIG. 2.

FIG. 4 shows a rear perspective view of the base 32 according to one embodiment. The base 32 includes a face plate 34 extending along a longitudinal axis A. The longitudinal axis A will generally run parallel with a height direction of the passive door panel 12. The height direction may correspond with the Z axis shown in FIG. 1 relative to the entryway 10. A first boss 36 extends from the face plate 34 in a rearward direction. A forward/rearward direction is defined perpendicular to the stile of a door panel, the forward direction being away from the door panel and the rearward direction generally toward the door panel. When the passive door panel 12 is closed, the forward/rearward direction corresponds with the X-axis shown in FIG. 1.

The first boss 36 may include one or more fastener holes 38 to accommodate fasteners, such as screws, used to mount the base 32 relative to the passive door panel 12 or the astragal. The fastener holes 38 may generally extend perpendicular to the face plate 34 and the longitudinal axis A. Therefore the fastener holes 38 extend along the forward/rearward direction. The first boss 36 may also accommodate a guide bore 40. The guide bore 40 has a central axis substantially parallel with the longitudinal axis A.

The face plate 34 of the base 32 may include an aperture 42 extending through the face plate. The aperture 42 is configured to receive a portion of a catch for use in actuating the bolt assembly 30. Adjacent to the aperture 42, a second boss 44 may extend rearwardly from the face plate 34. The second boss 44 includes a retention cavity 46 formed therein. The retention cavity 46 may be best seen in FIG. 8. The retention cavity 46 is sized and shaped to retain the catch for the bolt assembly 30.

Having described the base 32 according to one embodiment, one of ordinary skill in the art will appreciate suitable alternatives within the scope of the present disclosure for securing the bolt assembly 30 in a fixed position relative to the passive door panel 12. For example, fastener holes 38 may be fewer or greater in number. The fastener holes 38 may be provided at locations other than the first boss 36. Further, support structure for the fastener holes 38, guide bore 40 and retention cavity 46 may be provided without distinct bosses if the base 32 is sufficiently structurally strong. In other embodiments, the base 32 may be mounted relative to the passive door panel 12 by means other than screws, such as a snap fit with integrated or attached clips.

Returning briefly to FIGS. 2 and 3, the bolt assembly 30 also includes a bolt 50 attached to the base 32. The bolt 50 is attached to the base 32 in a manner that allows the bolt 50 to translate relative to the base 32. As a result, in use, the bolt 50 is able to selectively translate relative to the passive door panel 12 between a retracted position and an extended position. As commonly understood in the art of shoot bolt hardware, the retracted position includes an engagement end 52 of the bolt 50 positioned substantially at or inward of a respective top or bottom edge of the passive door panel 12. The extended position, on the other hand, involves the engagement end 52 of the bolt 50 extending outward beyond the respective upper or lower edge of the passive door panel 12 into engagement with a header 20 or a threshold 22 respectively.

Figure 5:
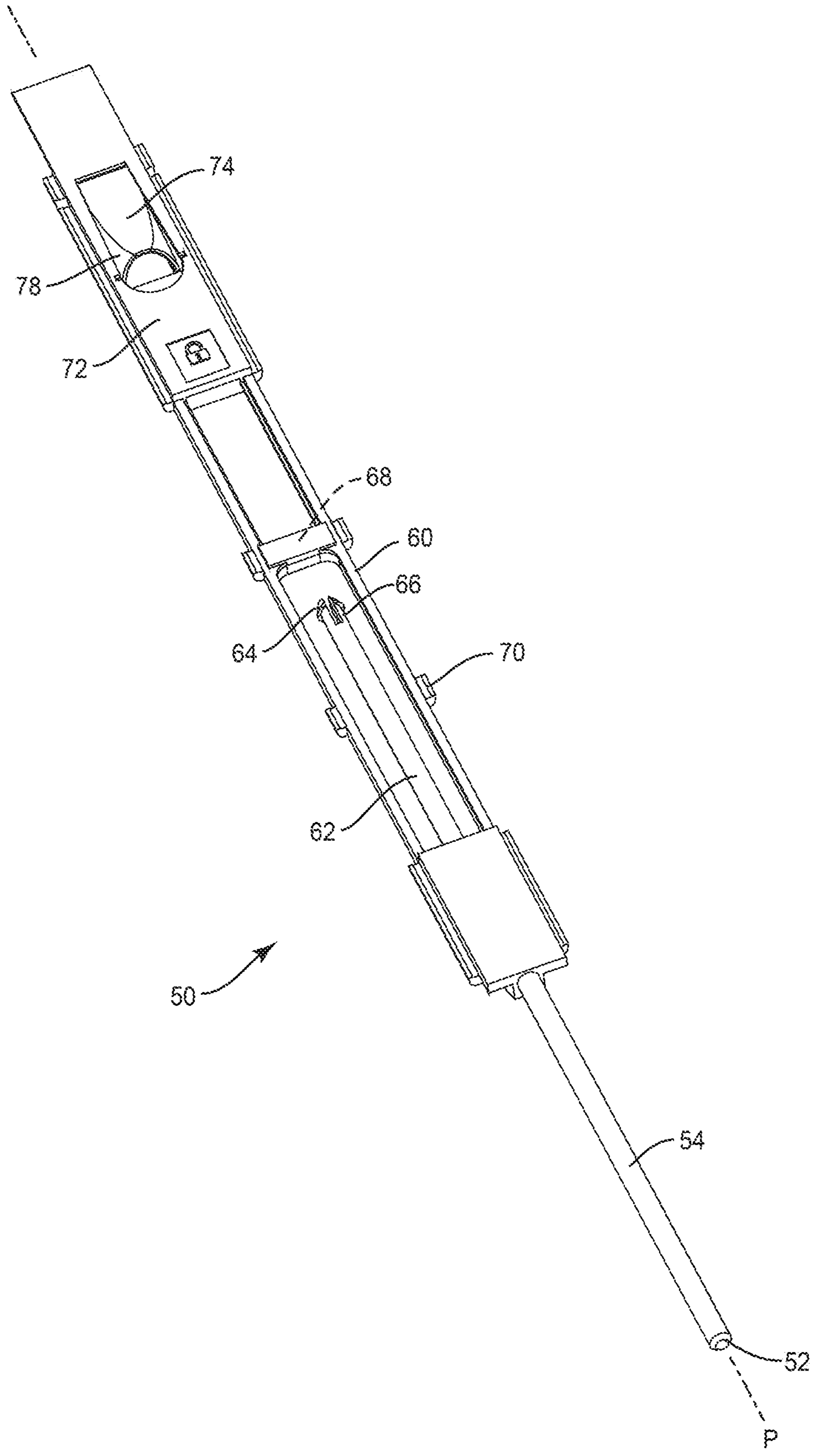
FIG. 5 is a detailed front view of the bolt of the bolt assembly of FIG. 2.
Figure 6:
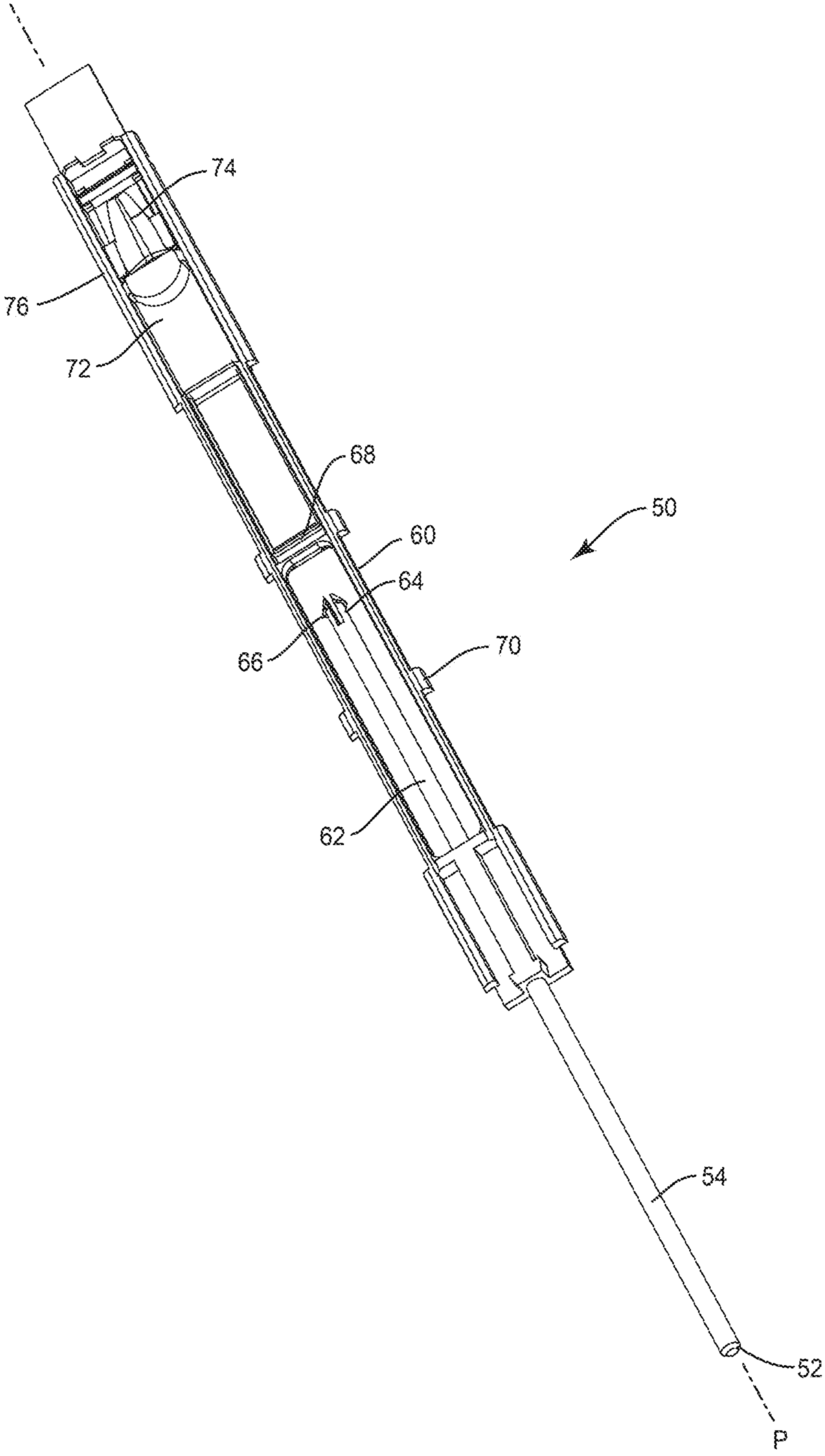
FIG. 6 is a detailed rear view of the bolt of the bolt assembly of FIG. 2.

FIGS. 5 and 6 show front and rear views of the bolt 50 respectively. The engagement end 52 may be provided by a pin 54. The pin 54 has a longitudinal pin axis P which will be substantially parallel with the longitudinal axis A of the base 32 when the bolt assembly 30 is assembled. The pin 54 is preferably a strong metal, such as steel, to provide strength while the pin is engaged with the entryway 10.

In the illustrated embodiment, a slide 60, formed from a polymer, is overmolded onto the pin 54. In other embodiments the pin 54 and the slide 60 may be formed as a unitary, integral component formed from metal or plastic. The slide 60 may include a post 62. A tip 64 of the post 62 may have sprung barbs 66. This configuration allows the bolt 50 to attach to the base 32 by inserting the post 62 into and through the guide bore 40 as seen in FIG. 3. Once attached, the sprung barbs 66 prove a stop, maintaining attachment between the post 62 and the base 32 while providing a limit on relative translation between the base 32 and the bolt 50.

As seen in FIG. 6, the slide 60 also includes a retention pocket 68. The retention pocket 68 is used to selectively maintain the bolt 50 in the retracted position. Retention of the slide 60 will be discussed further below with respect to FIG. 8.

In some embodiments, one or more flanges 70 may be provided along the length of the slide 60. The flanges 70 extend perpendicular to the longitudinal pin axis P. The flanges 70 can help position and retain the slide 60 within an astragal as discussed below. The flanges 70 may be continuous along some or all of the length of the slide 60. Alternatively, as shown, the flanges 70 may be provided as various segments along the slide 60.

In the illustrated embodiment, the bolt 50 also includes an interface 72 located on an opposite end of the slide 60 from the pin 54. The interface 72 is accessed by a user to manually return the bolt 50 from the extended position to the retracted position. Various structures may be provided to assist the user with gripping and translating the bolt 50. Projections may act as handles. Alternatively, grooves or apertures may be configured to assist with manipulation of the bolt 50 with the user's finger(s). In one embodiment, the interface 72 includes a pivoting pull tab 74. The pull tab 74 may be pivotably connected to a body portion 76 of the slide 60. The pull tab 74 is pivotable between a closed position, with the pull tab substantially recessed within the body portion 76, and an open position, where the pull tab extends forward away from the stile of the passive door panel. The pull tab 74 may include beveled portions 78. If an active door panel 14 is being closed while the pull tab 74 is in the open position, the active door panel can pivot the pull tab rearward toward the closed position and out of the way of the closing active door panel by pushing upon one of the beveled portions 78.

Back in FIGS. 2 and 3, a spring 90, such as a coil spring, is shown supported by the post 62 and retained between the slide 60 and the base 32. The spring 90 is a compression spring. The spring 90 is arranged between the bolt 50 and the base 32 to bias the bolt toward the extended position with the engagement end 52 of the bolt 50 a maximum distance from the base 32.

Figure 7:
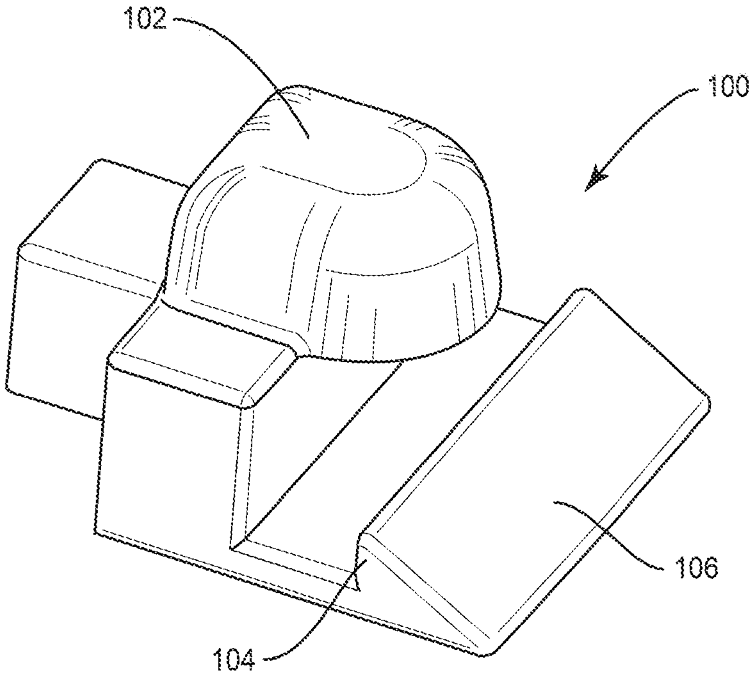
FIG. 7 is a detailed view of the catch of the bolt assembly of FIG. 2.

To selectively retain the bolt 50 in the retracted position, and provide resistance to the desired extension caused by the spring 90, a catch 100 is attached to the base 32. The catch 100 is shown in more detail in FIG. 7. The catch 100 includes an actuation button 102 in the form of a projection arranged to correspond with the aperture 42 through the face plate 34 of the base 32. Thus, the aperture 42 provides access for a user to press against the actuation button 102 and deflect the catch 100 relative to the base 32.

The catch 100 also include a keeper 104 configured to engage the retention pocket 68 of the slide 60 to hold the bolt 50 in the retracted position. The keeper 104 includes a tapered leading edge 106. While the bolt 50 is being retracted, the retention pocket 68 contacts the tapered leading edge 106 of the catch 100 to deflect the catch relative to the base 32 until the catch mates with the interior of the retention pocket.

Figure 8:
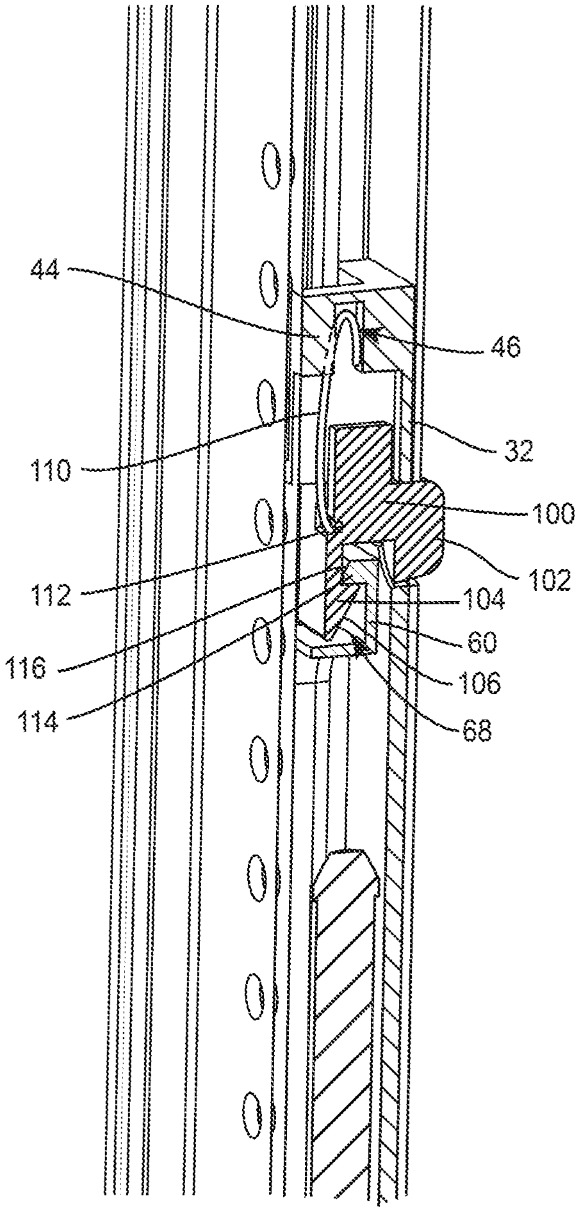
FIG. 8 is a cross section of the bolt assembly in the retracted position.

Retention of the slide 60 by the catch 100 may be best understood in view of the cross section shown in FIG. 8. First, the catch 100 is attached to the base 32 by a leaf spring 110. The leaf spring 110 biases the catch 100 forward to an engagement position where the actuation button 102 extends through the aperture 42 of the base 32. One end of the leaf spring 110 is press fit into the retention cavity 46 of the base 32. The other end of the leaf spring 110 may engage a notch 112 along the rear side of the catch 100. In the engagement position shown, the keeper 104 of the catch 100 is configured to engage with the retention pocket 68 of the slide 60 when the bolt 50 is in the retracted position.

As should be understood, to release the bolt 50 from the retracted position to the extended position, the user deflects the catch 100 to a release position relative to the base 32. Deflection of the catch 100 is in opposition to the biasing force provided by the leaf spring 110. By pressing upon the actuation button 102, the keeper 104 is disengaged from the retention pocket 68. The spring 90 is then free to push the bolt 50 toward the extended position.

To return the bolt 50 to the retracted position, the slide 60 is manually retracted with the user interface 72. A leading wall 114 forming the retention pocket 68 is configured to displace the catch 100 relative to the base 32 by pressing upon the tapered leading edge 106 of the keeper 104. The leading wall 114 may similarly have a chamfered edge 116 to further assist with displacement of the catch 100 as the slide 60 approaches the retracted position.

Figure 9:
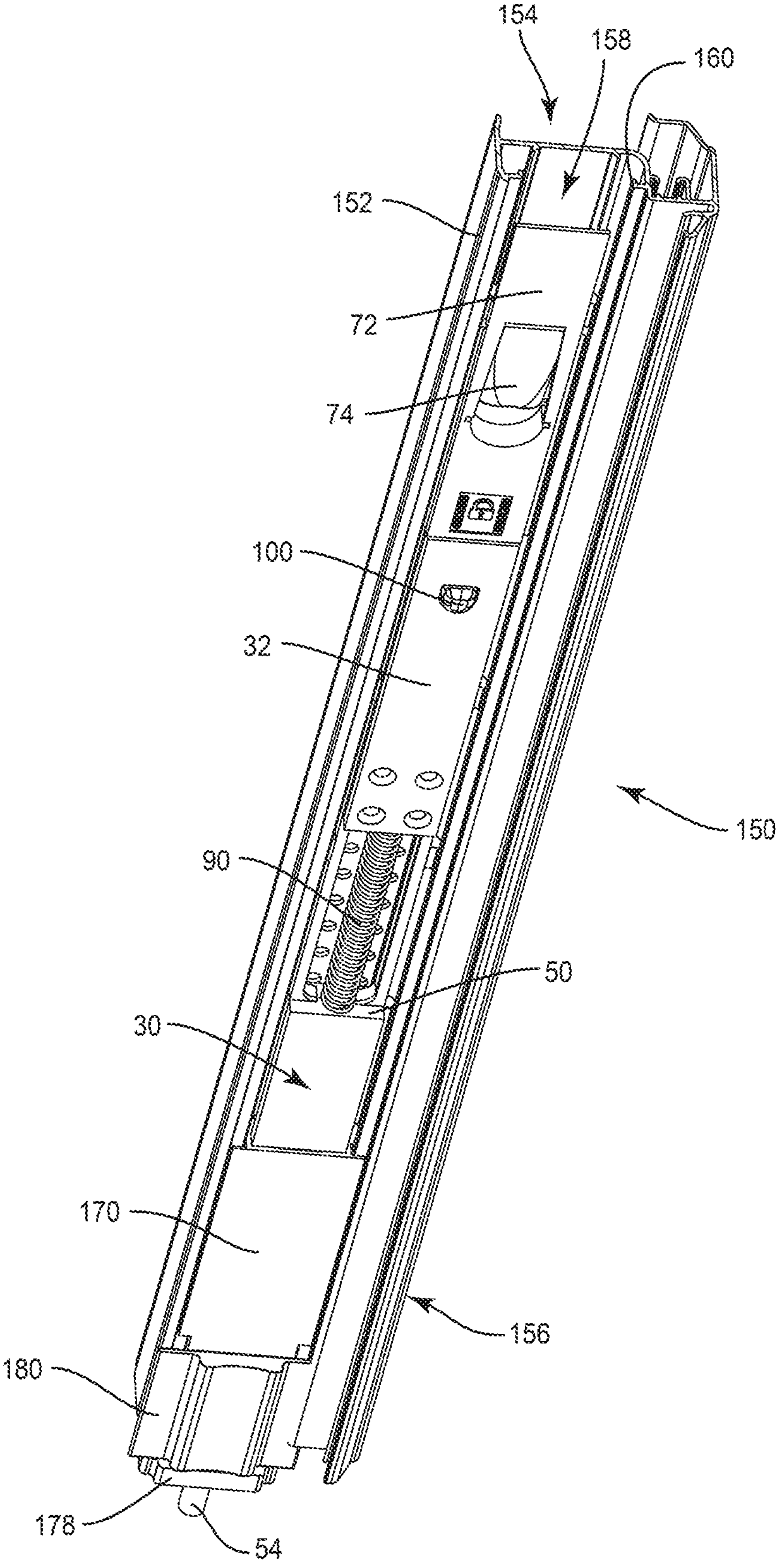
FIG. 9 is a partial cut-way view of the bolt assembly of FIG. 2 mounted within an astragal body.

Turning to FIG. 9, a partial cut-way view is provided that shows the bolt assembly 30 mounted at the lower end of an astragal assembly 150. The astragal assembly 150 includes an astragal body 152. The astragal body 152 may be an extrusion, such as an aluminum extrusion. The astragal body 152 provides a mounting side 154 for attachment to the stile of the passive door panel 12 and a front side 156 configured to face the free stile of the active door panel 14 when the active door panel is closed.

The astragal body 152 defines a channel 158 running along a length of the astragal body. The length of the astragal body 152 corresponds with the height of the passive door panel 12 when the astragal assembly 150 is attached to the passive door panel. FIG. 9 shows the bolt assembly 30 mounted at least partially within the channel 158. The illustrated bolt assembly 30 of FIG. 9 is shown adjacent to the bottom end of the astragal body 152. The bolt assembly 30 may be assembled along the channel 158 by insertion into one of the ends of the astragal body 152. In another embodiment, the bolt assembly 30 is sized and shaped such that the bolt assembly can rotate into the channel 158 at the desired location through the gap 160 in the face of the channel 158.

The illustrated bolt assembly 30 of FIG. 9 includes an optional lock block 170. The lock block 170 can also be seen in FIGS. 2 and 3. The lock block 170 includes a central passage 172 (see FIG. 3) through which the pin 54 extends. The lock block 170 may also include at least one leg 174 for attachment of the lock block 170 to the slide 60. The lock block 170 is configured to be able to translate relative to the bolt 50 and the base 32. In other words, the pin 54 is configured to slide relative to the central passage 172 and the lock block 170 is not fixedly mounted to the passive door panel 12 or the astragal body 152.

FIG. 3 shows a compression spring 176 operable between the slide 60 and the lock block 170. The compression spring 176 seeks to force the lock block 170 toward the engagement end 52 of the bolt 50. When the bolt 50 is released toward its extended position the lock block 170 is similarly urged to extend from the end of the astragal assembly 150. Contact between the lock block 170 and the threshold 22 may cause shortening of the compression spring 176. A bottom sealing pad 178 may be carried on the bottom of the lock block 170 and configured to help seal the lock block against the threshold 22. An optional corner sealing pad 180 may also be provided on and carried with the lock block 170 for sealing against the stile of the active door panel 14. In addition, an optional back sealing pad (not shown) may be provided on and carried with the lock block 170 on a face of the lock block opposite the corner sealing pad 180. When provided, the back sealing pad helps seal between the lock block 100 and an edge of the passive door panel by residing in an opening in the astragal body.

Figure 10:
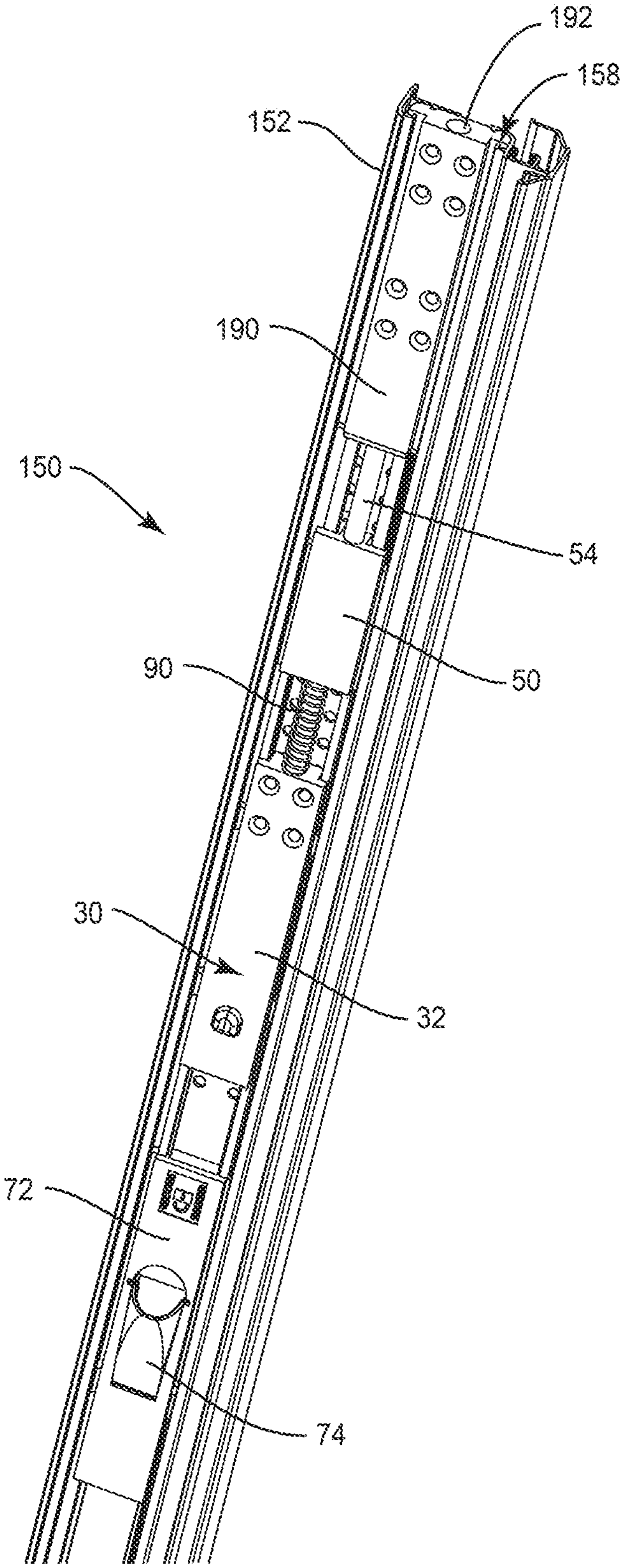
FIG. 10 is a perspective of the upper end of an astragal assembly having a bolt assembly according to an embodiment of the present disclosure.

FIG. 10 shows the top end of the astragal assembly 150. The bolt assembly 30 at the top end of the astragal assembly 150 is optionally provided with a guide block 190. The guide block 190 includes a guide passage 192 through which the pin 54 is configured to slidably extend as the bolt 50 is actuated between the retracted and extended positions thereof. Unlike the lock block 170 used at the bottom end of the astragal body 152, the guide block 190 is configured to be fixed within the channel 158. Therefore, the guide block 190 guides and stabilizes the pin 54, but does not extend from the top end of the astragal body 152. The guide block 190 will generally not include compression spring 176 or the sealing pads 178, 180 used with the lock block 170. Therefore use of the guide block 190 may reduce assembly time and component costs relative to using a lock block 170 on both the top and bottom of the astragal assembly 150. Sealing requirements at the top of an entryway 10 are generally less critical than at the bottom because the top is less susceptible to penetration by wind-blown water. Therefore, the sealing benefits of the lock block 170 may be less necessary at the top of the astragal assembly 150, therefore promoting use of the guide block 190.

Figure 11:
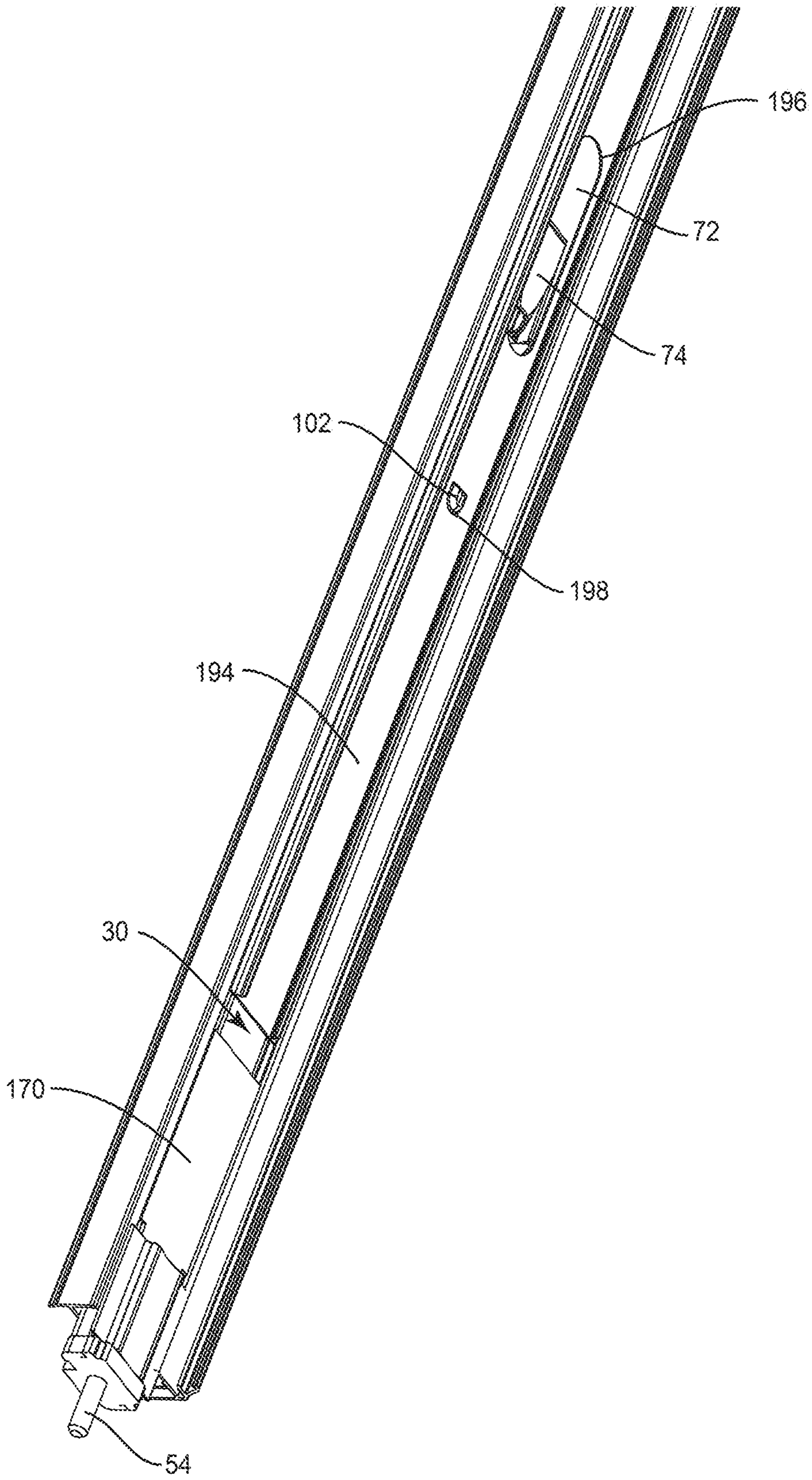
FIG. 11 is a lower end perspective of a complete astragal having the bolt assembly of FIG. 9

As seen in FIG. 11, one or more trim covers 194 may be mounted to the astragal body to at least partially enclose the channel. The trim cover 194 may be provided with a slot 196 for providing access to the user interface 72 of the bolt assembly. The trim cover 194 may include a hole 198 for providing access to the actuation button 102 of the bolt assembly 30.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A bolt assembly configured to secure a passive door panel relative to an entryway frame, the bolt assembly comprising:
- a first spring;
- a catch attached to the passive door panel by the first spring, the catch having an engagement position and a release position, the first spring biasing the catch towards the engagement position; and
- a bolt configured to longitudinally translate relative to the passive door panel between a retracted position and an extended position, the bolt biased towards the extended position, the bolt comprising:
  - a slide engaged with the catch in the retracted position to retain the bolt in the retracted position;
  - a pin attached to the slide for longitudinal movement therewith, the pin configured to engage the entryway frame when the bolt is in the extended position, the catch deflectable against bias of the first spring towards the release position in which the catch disengages the slide such that the slide and the pin of the bolt translate towards the extended position; and
- a pull operably connected to the slide, the pull configured to translate the bolt from the extended position to the retracted position.

2. The bolt assembly according to claim 1, further comprising a base configured to mount to the passive door panel or an astragal on the passive door panel such that the base is fixed relative to the passive door panel, the first spring secured to the base.

3. The bolt assembly according to claim 1, wherein the catch comprises a keeper configured to engage the slide to maintain the slide in the retracted position when the catch is in the engagement position.

4. The bolt assembly according to claim 3, wherein the slide includes a protrusion, the keeper engaged with the protrusion when the catch is in the engagement position and the slide is in the retracted position such that the slide is maintained in the retracted position.

5. The bolt assembly according to claim 1, wherein the slide is overmolded onto the pin.

6. The bolt assembly according to claim 1, wherein the pull pivotably connects to the slide.

7. The bolt assembly according to claim 6, wherein the pull is pivotable between a recessed closed position and an open position in which the pull is configured to extend away from the door panel.

8. The bolt assembly according to claim 7, wherein the pull comprises beveled portions configured such that the pull can be pushed from the open position to the closed position if an active door is being closed while the pull is in the open position.

9. The bolt assembly according to claim 4, wherein the keeper comprises a tapered edge, as the bolt is slid from the extended position to the retracted position, the protrusion contacts the tapered edge to deflect the catch toward the release position.

10. The bolt assembly according to claim 1, further comprising a lock block, the lock block configured to translate relative to the bolt.

11. The bolt assembly according to claim 10, further comprising one or more sealing pads fixed to the lock block.

12. The bolt assembly according to claim 10, further comprising a second spring operable between the bolt and the lock block.

13. An astragal configured to be mounted to a passive door panel, the astragal comprising:
- an astragal body having a channel running along a length of the astragal body; and
- a bolt assembly according to claim 1 mounted at least partially within the channel.

14. The astragal according to claim 13, wherein the bolt assembly rotationally fits into the astragal body.

15. An astragal configured to secure a passive door panel relative to an entryway frame, the astragal comprising:
- an astragal body having a channel running along a length of the astragal body; and
- a bolt assembly, comprising:
  - a bolt translatable within the channel between a retracted position and an extended position;
  - a catch attached to the astragal body by a first spring, the catch configured to retain the bolt in the retracted position; and a second spring configured to bias the bolt towards the extended position, the catch having a first position in which the catch is configured to retain the bolt in the retracted position and a second position in which the catch is configured to disengage the bolt such that the second spring translates the bolt towards the extended position, the catch in the first position and disengaged from the bolt when the bolt is in the extended position.

16. The astragal according to claim 15, further comprising a pull attached to the bolt, the pull pivotable between a recessed closed position and an open position in which the pull extends away from the door panel.

17. The astragal according to claim 15, further comprising a lock block, the lock block configured to translate relative to the bolt.

18. The astragal according to claim 17, further comprising one or more sealing pads fixed to the lock block.

19. A bolt assembly configured to secure a passive door panel relative to an entryway frame, the bolt assembly comprising:

a first spring;

a catch attached to the passive door panel by the first spring, the catch configured to deflect between an engagement position and a release position, the first spring biasing the catch towards the engagement position, the catch comprising:

an actuation button; and a keeper; and a bolt configured to translate between a retracted position and an extended position, the bolt comprising:

a slide having a protrusion, the keeper configured to engage the protrusion to retain the bolt in the retracted position;

a pin attached to the slide for movement therewith, the pin configured to engage the entryway frame when the bolt is in the extended position; and a second spring configured to translate the bolt towards the extended position in response to deflection of the catch from the engagement position towards the release position such that the keeper of the catch disengages the protrusion.

20. The bolt assembly of claim 19, wherein the first spring is a leaf spring.

* * * * *